(12) United States Patent
Michaud et al.

(10) Patent No.: US 8,528,183 B2
(45) Date of Patent: Sep. 10, 2013

(54) SYSTEM FOR INSERTING BLIND ATTACHMENTS

(76) Inventors: Steeve Michaud, Sherbrooke (CA);
Benoit Langlois, Ste-Catherine-de-Hatley (CA)

(*) Notice: Subject to any disclaimer, the term of this patent is extended or adjusted under 35 U.S.C. 154(b) by 382 days.

(21) Appl. No.: 12/771,984

(22) Filed: Apr. 30, 2010

(65) Prior Publication Data
US 2010/0306985 A1    Dec. 9, 2010

(30) Foreign Application Priority Data

Jun. 5, 2009   (GB) .................................. 0909700.7

(51) Int. Cl.
  *B23P 11/02*   (2006.01)
  *B23B 39/02*   (2006.01)
(52) U.S. Cl.
  USPC ............................................. 29/451; 408/146
(58) Field of Classification Search
  USPC ............ 29/451, 428, 33 R, 450, 453, 407.05,
         29/469, 897.2; 408/46, 69, 146; 83/358
  See application file for complete search history.

(56) References Cited

U.S. PATENT DOCUMENTS

| | | | |
|---|---|---|---|
| 2,972,789 A | 2/1961 | Mathues | |
| 3,139,674 A | 7/1964 | Liday at al | |
| 3,199,184 A | 8/1965 | Harris et al. | |
| 4,569,116 A | 2/1986 | Enterkin | |
| 4,615,094 A | 10/1986 | Kai et al. | |
| 6,241,835 B1 * | 6/2001 | Abe et al. | 156/73.2 |
| 7,111,374 B2 | 9/2006 | Stewart | |
| 2003/0188425 A1 | 10/2003 | Steward | |
| 2005/0115375 A1 * | 6/2005 | Dick et al. | 83/358 |

FOREIGN PATENT DOCUMENTS

| | | |
|---|---|---|
| JP | S60-71132 A | 4/1985 |
| JP | H10-281121 A | 10/1998 |

OTHER PUBLICATIONS

Filing of Prior Art Under Article 34 of the Patent Act filed in the corresponding Canadian Application No. 2,701,570, on Nov. 6, 2012.
English translation of the Filing of Prior Art Under Article 34 of the Patent Act filed in the corresponding Canadian Application No. 2,701,570, on Nov. 6, 2012.

* cited by examiner

*Primary Examiner* — John C Hong

(57) ABSTRACT

An improved system for inserting blind attachments has an entry point and an exit point for a seal. The seal enters by way of the entry point and continues its guided course by being moved by a pair of servo pullers. A linear drive servo drill makes a first hole into the seal and, as the seal is moved by the servo pullers, the first hole is in position to have a blind attachment inserted therethrough byway of an insertion tool. At the same time that the blind attachment is inserted, a second hole is made in the seal by having the servo drill moved at the appropriate location.

9 Claims, 2 Drawing Sheets

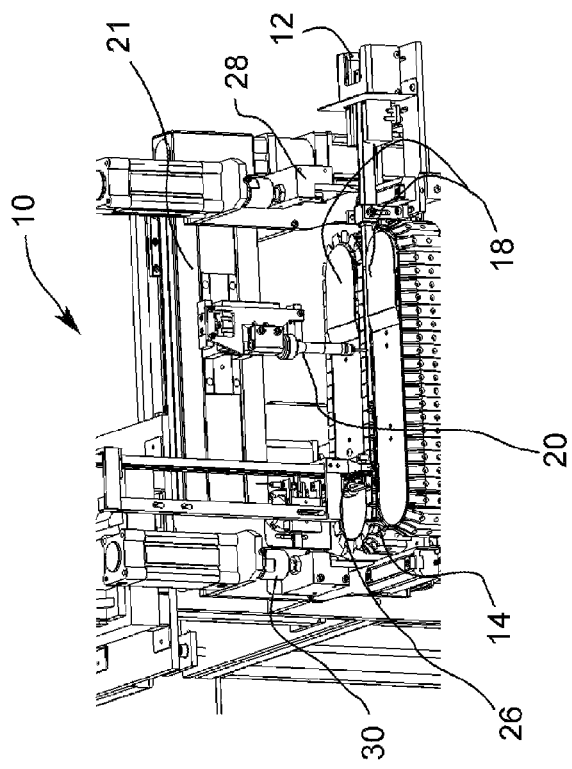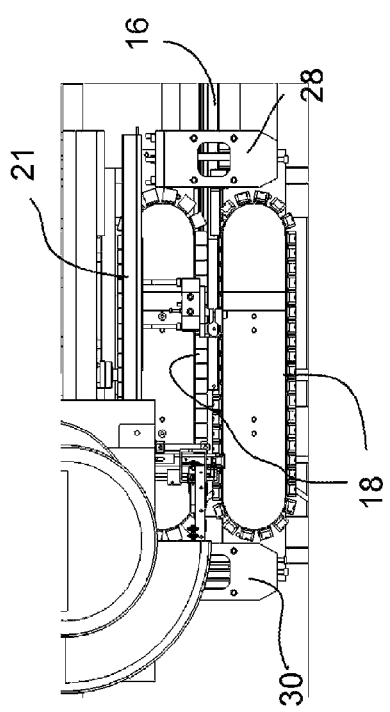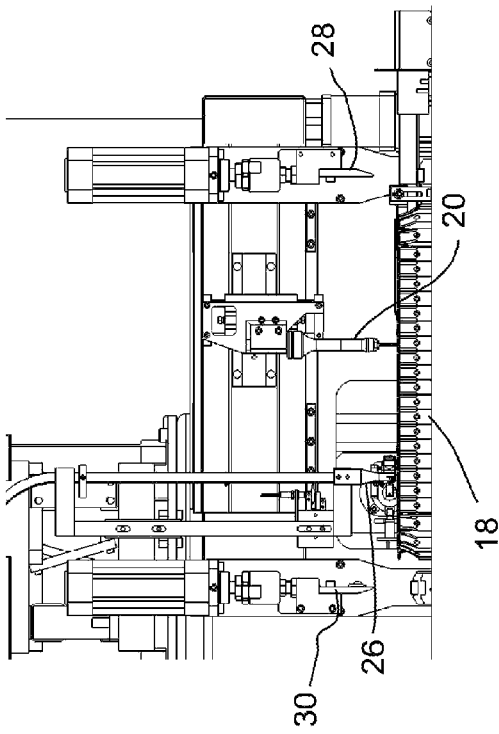

SYSTEM FOR INSERTING BLIND ATTACHMENTS

This application claims priority based on UK grant of patent GB0909700.7 filed Jun. 5, 2009

FIELD OF THE INVENTION

The present invention relates generally to manufacturing methods but more particularly to the insertion of blind attachments into extruded seals.

BACKGROUND OF THE INVENTION

In various industries, such as the car industry, for example, there is a need for rubber seals made using an extrusion process. After being extruded, the seals sometimes need an attachment means which will attach the seal to a door, for example. The current methods are quite slow because a hole is first drilled and then the attachment means is installed and the two operations are not done simultaneously.

SUMMARY OF THE INVENTION

In view of the foregoing disadvantages inherent in the known devices now present in the prior art, the present invention, which will be described subsequently in greater detail, is to provide objects and advantages which are:

To provide for a way of combining two operations, that of drilling the next hole while the blind attachment is inserted in the previously drilled hole.

To attain these ends, the present invention generally comprises an apparatus adapted to hold and move a seal member along a predetermined linear path; a linear drive servo drill; a drive belt rotationally attached to the apparatus and adapted to move the servo drill along a predetermined linear path parallel to the linear path of the seal member; such that the servo drill is used to drill a plurality of holes in the seal member at predetermined points along its length.

The linear motion of the servo drill is adapted to be in cooperation with the linear motion of the seal member.

An insertion device is mechanically attached to the apparatus and adapted to insert a blind attachment within one of the plurality of holes after the seal member is moved from the position wherein the one of the plurality of holes was formed by the servo drill.

The insertion device is adapted to insert a plurality of blind attachments respectively into a plurality of the holes in succession as the servo drill and the seal member move linearly respectively at the same time.

A pair of servo pullers mechanically attached to the apparatus and adapted to move the seal member along its linear path.

An entry cutter attached to the apparatus and located at an entry point where the seal member is adapted to enter the apparatus, and adapted to cut the seal member at a desired location; and an exit cutter attached to the apparatus and located at an exit point where the seal member is adapted to exit the apparatus, and adapted to cut the seal member at a desired location.

A method for inserting blind attachments within a seal member comprising the steps of providing an apparatus for hold and moving a seal member along a predetermined linear path; providing a pair of servo pullers mechanically attached to the apparatus and adapted to move the seal member along the linear path; providing a linear drive servo drill; providing a drive belt rotationally attached to the apparatus and adapted to move the servo drill along a predetermined linear path parallel to the linear path of the seal member, such that the linear motion of the servo drill is adapted to be in cooperation with the linear motion of the seal member; providing an entry cutter attached to the apparatus and located at an entry point where the seal member is adapted to enter the apparatus, and adapted to cut the seal member at a desired location; providing an exit cutter attached to the apparatus and located at an exit point where the seal member is adapted to exit the apparatus, and adapted to cut the seal member at a desired location; and providing an insertion device mechanically attached to the apparatus and adapted to insert a blind attachment within one of the plurality of holes after the seal member is moved from the position wherein the one of the plurality of holes was formed by the servo drill.

The method for inserting blind attachments wherein the seal member enters the apparatus, is moved linearly along its respective path; the servo drill moves along its respective path drilling a plurality of holes in the seal member at predetermined points along its length; wherein the insertion device inserts a plurality of blind attachments respectively into a plurality of the holes in succession as the servo drill and the seal member move linearly respectively at the same time; wherein the entry cutter cuts the seal member at a predetermined length; and wherein the exit cutter cuts the seal member when the desired length of the seal member is achieved and reaches the exit cutter.

The servo drill makes a first hole into the seal member; the seal is moved a predetermined amount; the first hole is then in position to receive a blind attachment; a blind attachment is then inserted through the first hole by the insertion device, and at the same time the servo drill is moved a predetermined amount and drills a second hole in the seal member; wherein this operation is repeated a plurality of times until the predetermined number of blind attachments are connected to the seal member.

In a system for inserting blind attachments into extruded seals comprising drilling members and insertion devices, the improvement comprising an apparatus adapted to hold and move a seal member along a predetermined linear path; a linear drive servo drill; a drive belt rotationally attached to the apparatus and adapted to move the servo drill along a predetermined linear path parallel to the linear path of the seal member; such that the servo drill is used to drill a plurality of holes in the seal member at predetermined points along its length.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 1a-c top, front and isometric views, respectively, of the invention.

DETAILED DESCRIPTION OF THE PREFERRED EMBODIMENT

Figure 2:
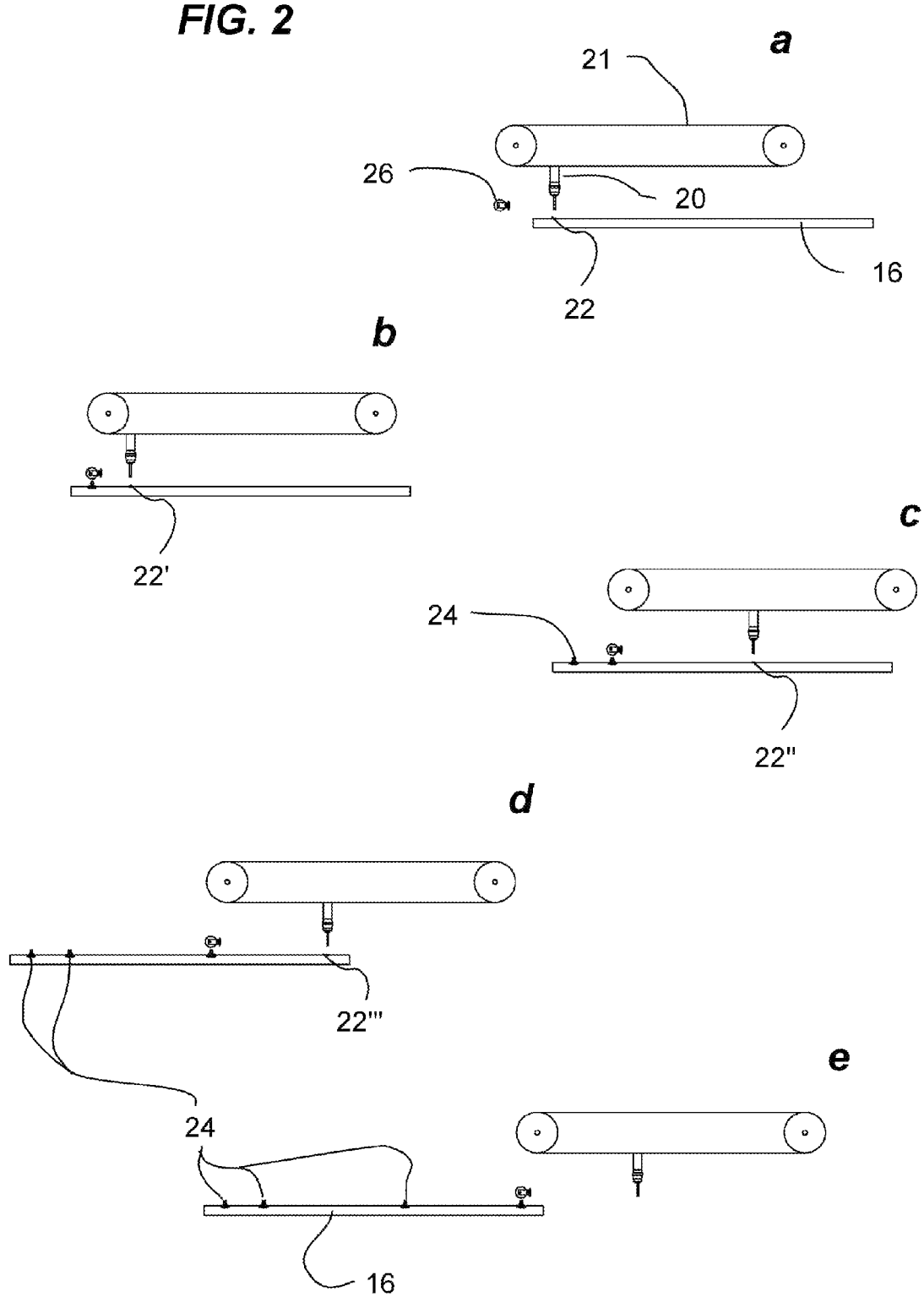
FIGS. 2a-e Diagram views of the sequence of operations.

An improved system for inserting blind attachments (10) is part of an existing blind attachment apparatus as is known in the art and as such, only the components specific to this invention are discussed in details. The improved system for inserting blind attachments (10) has an entry point (12) and an exit point (14) for the passage of a seal (16). The seal (16) enters by way of the entry point (12) and continues its guided course by being moved by a pair of servo pullers (18).

As shown in the series of figures from 2a to 2e, inclusively, a linear drive servo drill (20) running along a drive belt (21) makes a first hole (22) into the seal (16) and, as the seal (16) is moved, the first hole (22) is in position to have a blind attachment (24) inserted therethrough by way of an insertion tool (26). At the same time that the blind attachment (24) is inserted, a second hole (22') is made in the seal (16) by having the servo drill (20) moved at the appropriate location, as per FIG. 2b, for example. The other figures of the FIGS. 2a-e sequence show that the seal (16) and the servo drill (20) both move at the same time, which forces the servo drill (20) to adjust so as to drill holes (22, 22', 22", 22''') at the appropriate locations as the seal (16) positions itself under the blind attachment insertion device (26) which is itself stationary. An entry and an exit cutter (28, 30) cut the seal (16) to length.

The servo drill (20) is a known device used in many fields and the insertion tool (26) is similar to those currently in use.

The invention lies in the motion of the servo drill (20) running on a drive belt (21), in cooperation with the movement of the seal (16) along with the concurrent insertion of the blind attachment (24) by way of the insertion tool (26).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A system for inserting blind attachments comprising:
   a pair of servo pullers adapted to hold and move a seal member along a predetermined linear path;
   a servo drill for drilling a plurality of holes in said seal member at predetermined points along its length; and
   an insertion device, linearly separated from the servo drill along the predetermined linear path, for inserting a blind attachment within one of said plurality of holes after said seal member is moved from a position of the servo drill.

2. The system for inserting blind attachments of claim 1, further comprising:
   an entry cutter located at an entry point of said system and adapted to cut said seal member at a desired location; and
   an exit cutter located at an exit point and of said system adapted to cut said seal member at a desired location.

3. The system for inserting blind attachments of claim 1, comprising a drive belt rotationally attached to said apparatus and adapted to move said servo drill along a respective linear path parallel to said predetermined linear path of said seal member.

4. The system for inserting blind attachments of claim 3, wherein the linear motion of said servo drill is adapted to be in cooperation with said linear motion of said seal member.

5. The system for inserting blind attachments of claim 3, wherein said insertion device is adapted to insert a plurality of blind attachments into a plurality of respective said holes in succession as said servo drill and said seal member both move at the same time.

6. A method for inserting blind attachments within a seal member comprising:
   holding a seal member between a pair of servo pullers for moving the seal member along a predetermined linear path;
   drilling a plurality of holes in said seal member at predetermined points along its length, the drilling being effected by a servo drill;
   inserting a blind attachment within one of said plurality of holes after said seal member is moved from a position of the servo drill, the insertion being effected by an insertion device linearly separated from the servo drill along the predetermined linear path.

7. The method for inserting blind attachments of claim 6, comprising:
   moving said servo drill along a respective path parallel to said predetermined linear path of said seal member for drilling the plurality of holes in said seal member at predetermined points along its length;
   inserting a plurality of blind attachments into a plurality of respective of said holes in succession as said servo drill and said seal member both move at the same time.

8. The method for inserting blind attachments of claim 7, comprising:
   a) making a first hole into said seal member;
   b) moving said seal a predetermined amount so that said first hole is then in position to receive a blind attachment; and
   c) inserting a blind attachment through said first hole while moving said servo drill a predetermined amount for drilling a second hole in said seal member;
   wherein operations a), b) and c) are repeated a plurality of times until a predetermined number of blind attachments are connected to said seal member.

9. The system for inserting blind attachments of claim 1, wherein:
   the two pullers of the pair of servo pullers are positioned side by side along the predetermined linear path; and
   the position of the servo drill and a position of the insertion device are both within a length of the servo pullers.

* * * * *